US012423356B2

(12) United States Patent
Chandrasekaran et al.

(10) Patent No.: US 12,423,356 B2
(45) Date of Patent: Sep. 23, 2025

(54) SYSTEMS AND METHODS OF PROGRAMMATIC CONTROL OF SCALING READ REQUESTS TO A DATABASE SYSTEM

(71) Applicant: Salesforce, Inc., San Francisco, CA (US)

(72) Inventors: Venkatesan Chandrasekaran, San Francisco, CA (US); Valliappan Annamalai Natarajan, San Francisco, CA (US); Sidarth Srinivas Conjeevaram, New Haven, CT (US)

(73) Assignee: Salesforce, Inc., San Francisco, CA (US)

( * ) Notice: Subject to any disclaimer, the term of this patent is extended or adjusted under 35 U.S.C. 154(b) by 887 days.

(21) Appl. No.: 17/552,424

(22) Filed: Dec. 16, 2021

(65) Prior Publication Data

US 2023/0195799 A1 Jun. 22, 2023

(51) Int. Cl.
*G06F 16/903* (2019.01)

(52) U.S. Cl.
CPC .............................. *G06F 16/90335* (2019.01)

(58) Field of Classification Search
CPC ............................................ G06F 16/90335
See application file for complete search history.

(56) References Cited

U.S. PATENT DOCUMENTS

| 7,627,726 | B2 | 12/2009 | Chandrasekaran |
| 7,987,210 | B1 | 7/2011 | Wei |
| 7,987,470 | B1 | 7/2011 | Wei |
| 8,150,887 | B1 | 4/2012 | Wei |
| 8,171,006 | B1 | 5/2012 | Wei |
| 8,171,054 | B1 | 5/2012 | Wei |
| 8,244,778 | B1 | 8/2012 | Wei |
| 8,255,426 | B1 | 8/2012 | Wei |
| 8,275,808 | B2 | 9/2012 | Wei |
| 8,375,015 | B2 | 2/2013 | Wei |
| 8,560,572 | B2 | 10/2013 | Wei |
| 8,595,265 | B2 | 11/2013 | Wei |
| 8,656,410 | B1 | 2/2014 | Wei |
| 8,694,546 | B2 | 4/2014 | Wei |
| 8,930,336 | B2 | 1/2015 | Wei |
| 8,949,282 | B1 | 2/2015 | Wei |
| 9,009,731 | B2 | 4/2015 | Wei |
| 9,547,689 | B2 | 1/2017 | Chandrasekaran |
| 9,760,623 | B2 | 9/2017 | Wei |

(Continued)

*Primary Examiner* — Cam Y T Truong
(74) *Attorney, Agent, or Firm* — Butzel Long (57) ABSTRACT

System and methods are provided for modifying, at a server that is communicatively coupled to a database system that includes a primary node and one or more standby nodes, a class of an application program to route a request that is a read-only request to the database system to the one or more standby nodes of the database system. The application program may receive an input that executes an operation of the modified class of the application program. A read-only request may be transmitted to the database system for data to complete executing the operation of the modified class. The read-only request may be routed to one of the standby nodes to handle the read-only request for the data. The standby node may transmit the retrieved data to the server for the operation of the modified class to complete the execution of the operation for the application program.

14 Claims, 9 Drawing Sheets

(56) References Cited

U.S. PATENT DOCUMENTS

| | | |
|---|---|---|
| 10,078,618 B2 | 9/2018 | Chandrasekaran |
| 10,652,246 B2 | 5/2020 | Chandrasekaran |
| 10,693,709 B2 | 6/2020 | Chainani |
| 10,726,053 B2 | 7/2020 | Wei |
| 11,165,857 B2 | 11/2021 | Obembe |
| 2002/0116457 A1* | 8/2002 | Eshleman ............. H04L 67/288 709/203 |
| 2005/0149719 A1* | 7/2005 | Kilroy .................... G06F 21/54 713/152 |
| 2014/0123129 A1* | 5/2014 | Risbood ................ G06F 9/5072 717/176 |
| 2017/0147527 A1 | 5/2017 | Chandrasekaran |
| 2017/0351758 A1* | 12/2017 | Antic ................. G06F 21/6245 |
| 2019/0306008 A1 | 10/2019 | Chainani |
| 2019/0347167 A1* | 11/2019 | Wang .................. G06F 11/1464 |
| 2020/0028912 A1* | 1/2020 | Vermeulen ............ G06F 16/184 |
| 2020/0342008 A1 | 10/2020 | Wei |
| 2021/0082483 A1* | 3/2021 | Takeda ............... G11C 19/0808 |
| 2021/0126964 A1 | 4/2021 | Obembe |
| 2021/0357518 A1* | 11/2021 | Poe ......................... G06F 21/12 |
| 2023/0133608 A1* | 5/2023 | Kumar .................. G06F 16/215 707/703 |

* cited by examiner

```
public with rocs class MyClass {
  public static void myMethod() {
    List<Account> accounts = [SELECT id FROM Account WHERE name LIKE 'foo'];
    .......
  }
}
```

202 — (bracket over "with rocs")
200

FIG. 4B

```
public with sharing,rocs class MyClass {
  public static void myMethod() {
    List<Account> accounts = [SELECT id FROM Account WHERE name LIKE 'foo'];
    .......
  }
}
```

212 — (bracket over "with sharing,rocs")
210

SYSTEMS AND METHODS OF PROGRAMMATIC CONTROL OF SCALING READ REQUESTS TO A DATABASE SYSTEM

BACKGROUND

Current website-based commerce applications typically communicate with a database system to operate to provide information and perform transactions with customers. Some of these website-based commerce applications can provide personalized results for a customer, depending on the customer's profile and previous interaction with the website. Such current systems require caching of customer data to provide such personalized results in the website. As the number of customers visiting the website increase, the present systems are unable to scale to provide information, perform transactions, and provide personalized results. During high-demand times when many customers are attempting to access the website, there can be delays and system unavailability.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIGS. 1-3B show an example method of providing scalability of handling data access requests from an application to a database according to an implementation of the disclosed subject matter.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Implementations of the disclosed subject matter provide scalability of data access requests from an application to a database. Modified classes of an application (e.g., a web application, a commerce application, or the like) may be used to determine which requests to a database system that is communicatively coupled to a server executing the application can be sent to different nodes of a database system. The database system may have a primary node to handle read-write requests to the database, and one or more standby nodes (e.g., read-only replica nodes) to handle read-only requests. The number of standby nodes may be dynamically increased or decreased, depending on the number of requests being received by the database system. That is, read-only requests may be offloaded from the primary node of the database system to standby nodes, while the primary node may handle the write requests.

Standby nodes may be dynamically added or removed by monitoring of the number of requests, the execution time of the requests, and response time of the requests. The read-only requests may be distributed to the standby nodes to balance the requests amongst the standby nodes.

In revising a class in an application, a class modifier may be used to indicate a read-only request. Implementations of the disclosed subject matter allow for changes to be made with existing classes to provide scalability for read-only requests to the database system. By adding the class modifier to an application, the system may automatically send any read requests to the standby nodes. A language construct may be added to a class of the application for access control enforcement during a data access operation and/or for inherited sharing in nested classes. Providing such scalability may prevent users and/or customers of the application (e.g., a web application, a website storefront, or the like) from being turned away due to increased volume of requests to the application, and avoid database system unavailability.

In some prior systems, customer data of a database that was associated with a commerce application was cached. This allowed for execution of personalization of data requests based on customer profile, customer loyalty, or the like, but such systems were not scalable. That is, as the number of requests to the application and database increased, systems that cached the customer data were unable to handle the increased number of requests. Moreover, such systems typically experienced security issues regarding the vulnerability of customer data based on the system configurations in public cloud settings.

Implementations of the disclosed subject matter improve the function of a computing system by modifying application programs that make calls to a database system. Read-only requests may be directed to standby nodes of the database in order to handle increased traffic to the database system. The standby nodes may be dynamically adjusted to handle the changes in the number of read requests to the database system. In this arrangement, the application program and the database system may remain operational during high demand periods without crashing or delay to users.

FIGS. 1-3B show an example method 100 of providing scalability to handle data access requests from an application to a database according to an implementation of the disclosed subject matter.

Figure 1:
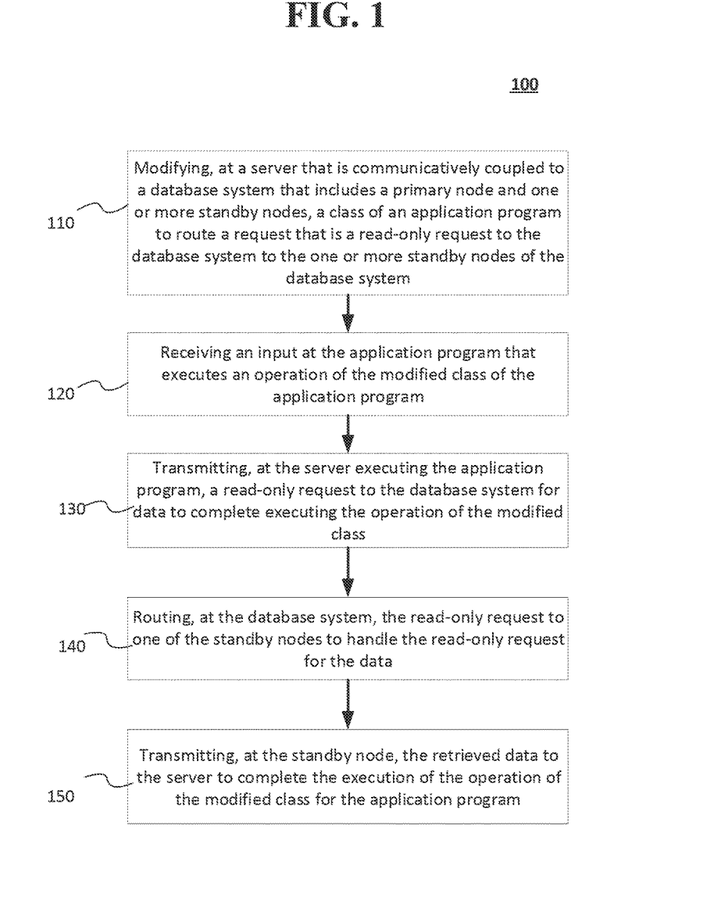
Figure 4A:
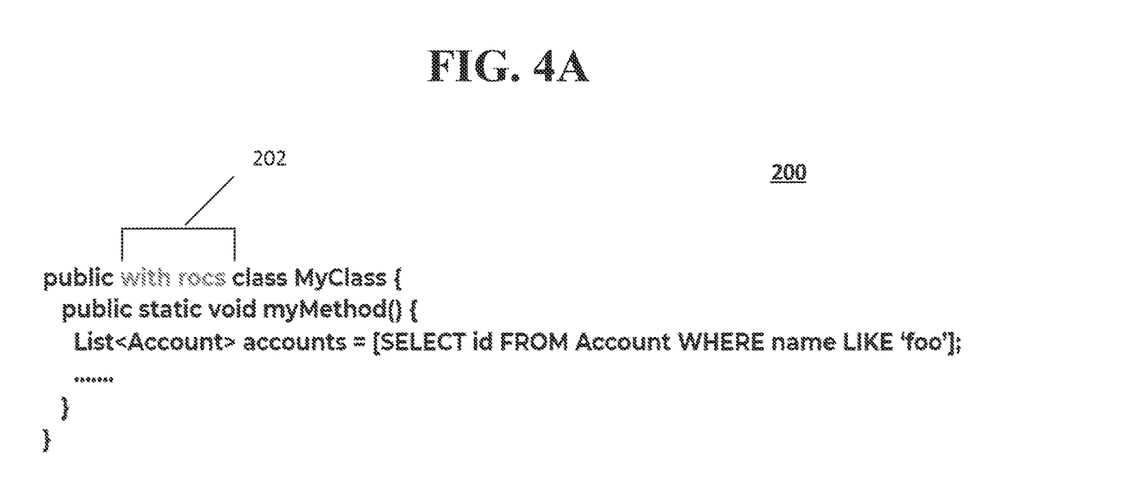
FIGS. 4A-4C show examples of modifications of classes according to an implementation of the disclosed subject matter.
Figure 4B:
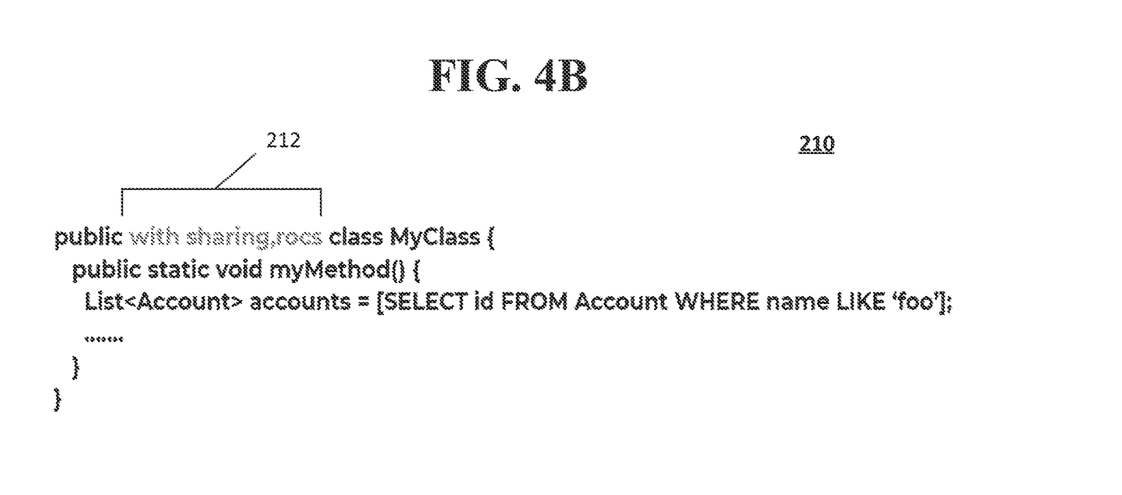
Figure 4C:
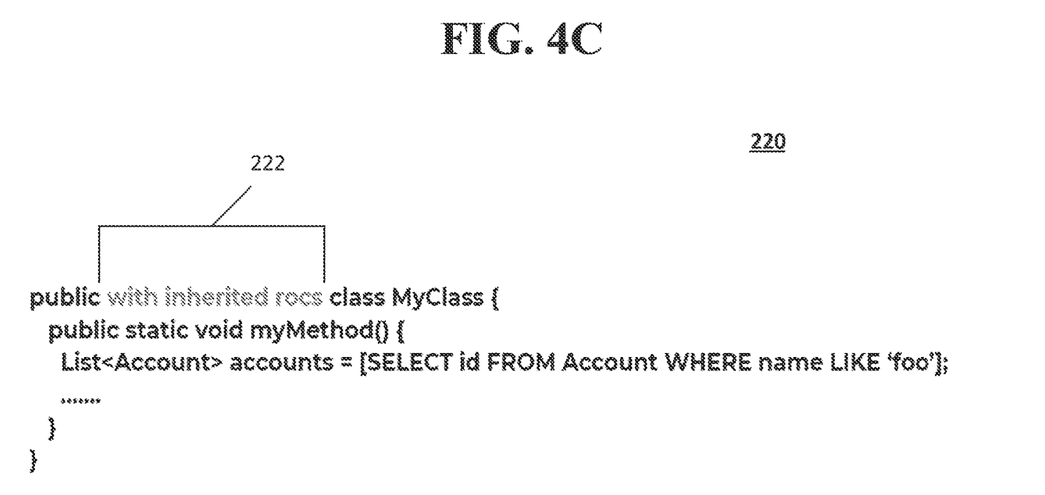
Figure 5:
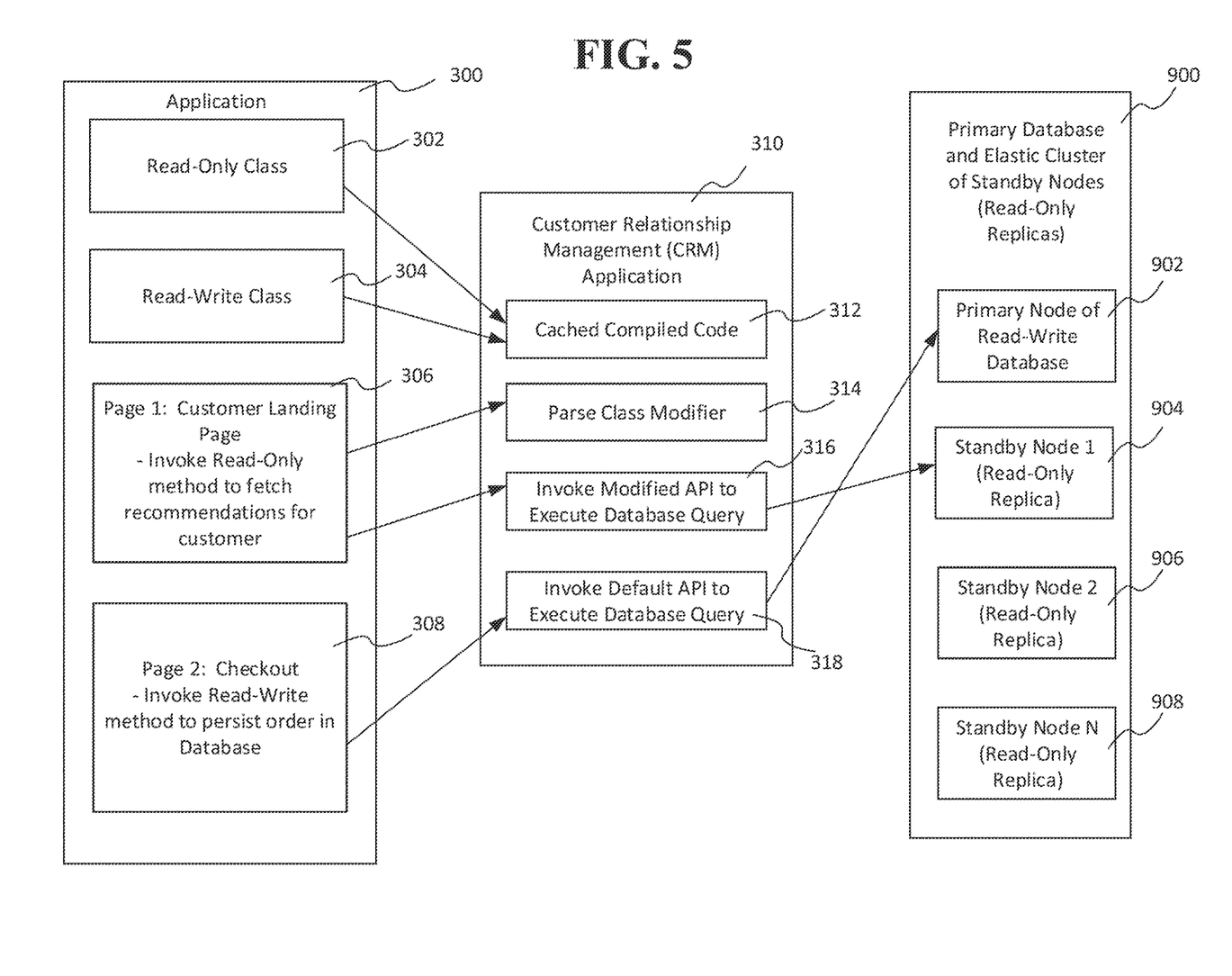
FIG. 5 shows an example using classes, an Application Programming Interface (API), and a database having a primary node and one or more standby (read-only) nodes according to an implementation of the disclosed subject matter.
Figure 6:
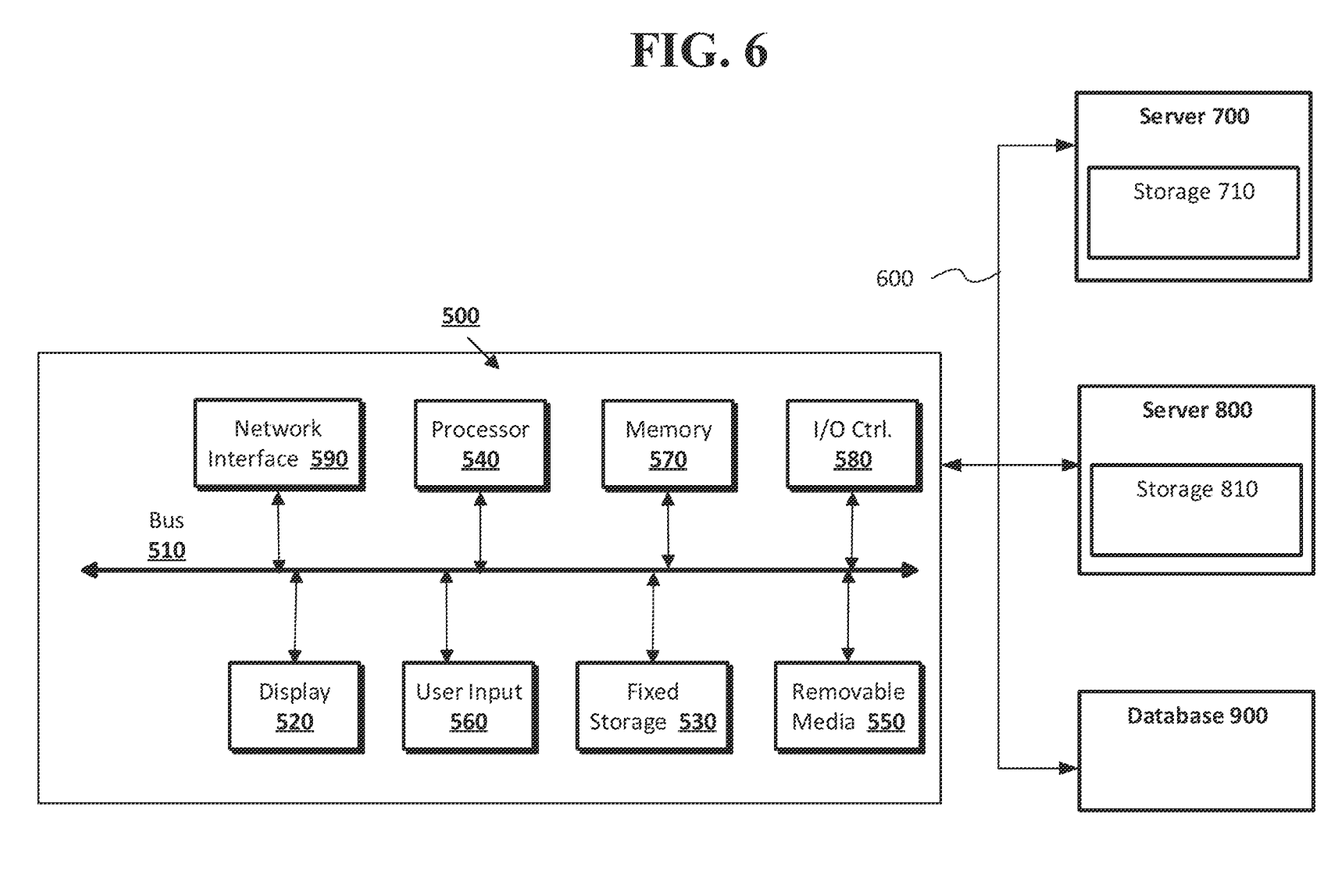
FIG. 6 shows hardware components that may implement the example of FIG. 5 according to an implementation of the disclosed subject matter.

As shown in FIG. 1, the method 100 may include operation 110, where a server (e.g., server 700 shown in FIG. 6) may modify a class of an application program (e.g., which may be stored in storage 700 and/or in storage 810 of server 800 shown in FIG. 6) to route a request that is a read-only request to a database system to one or more standby nodes (e.g., standby node 904, 906, and/or 908 shown in FIG. 5) of the database system (e.g., database 900 shown in FIGS. 5-6). The server may be communicatively coupled (e.g., via communications network 600) to the database system that includes a primary node (e.g., primary node of read-write database 902 shown in FIG. 5) and one or more standby nodes (e.g., standby node 904, 906, and/or 908 shown in FIG. 5, where the standby nodes may be read-only replicas of the primary node 902). The application program may be a web application, a website storefront, a commerce application, or the like. Examples of modified classes of the application program are shown in FIGS. 4A-4C and describe below.

At operation 120, the application program (e.g., application 310 shown in FIG. 5 that may be executed by server 800 shown in FIG. 6) may receive an input that executes an operation of the modified class of the application program. The application may receive the input via the communications network 600 from computer 500, as shown in FIG. 6. For example, the executed operation may direct a query of a database system to a standby node (e.g., standby node 904, 906, and/or 908 shown in FIG. 5) that may be a read-only replica of the primary node (e.g., primary node 902 shown in FIG. 5). For example, as shown in FIG. 5, a page 306 may be displayed for a telecommunications company web storefront, where a modified class may fetch recommendations for a phone and/or a calling plan for a customer using a modified class that may perform a read-only operation from a standby node 904, 906, and 908 from the database 900.

At operation 130, the server executing the application program (e.g., server 800 shown in FIG. 6) may transmit a read-only request to the database system (e.g., database 900 shown in FIGS. 5-6) for data to complete the execution of the operation of the modified class. For example, the read-only request may be transmitted to the database 900 to be handled by one of the standby nodes 904, 906, and/or 908.

At operation 140, the database system may route the read-only request to one of the standby nodes (e.g., standby node 904, 906, and/or 908 shown in FIG. 5) to handle the read-only request for the data. A standby node may be selected by the database system based on the number of requests that each of the standby nodes may be processing. For example, the read-only request may be routed at operation 140 to the standby node that is processing the fewest number of requests.

Figure 3A:
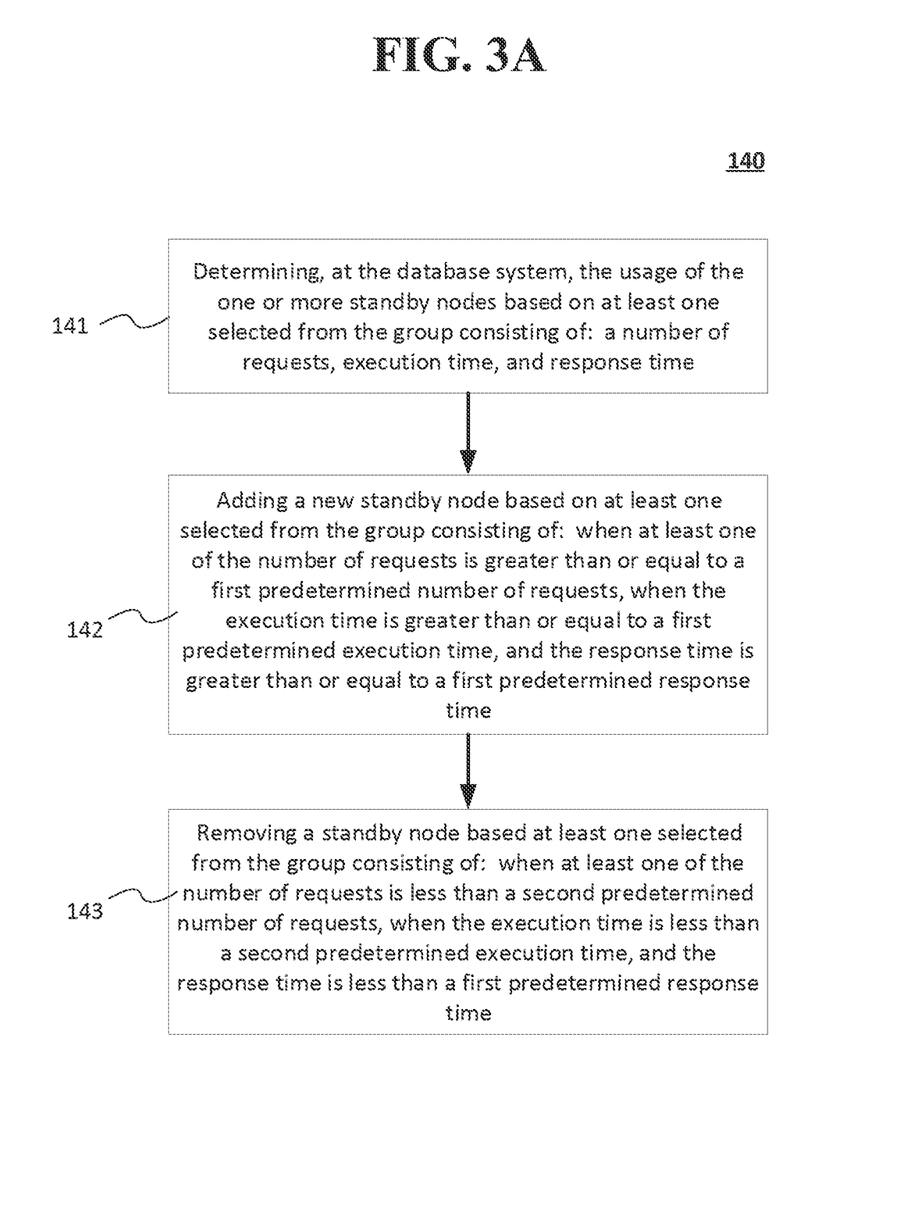

FIGS. 3A-3B show optional operations that may be part of operation 140. As shown in FIG. 3A, the database system (e.g., database 900 shown in FIGS. 5-6) may determine the usage of the one or more standby nodes (e.g., standby node 904, 906, and/or 908 shown in FIG. 5). The database may determine the usage based on a number of requests (e.g., the number of requests being handled by each of the standby nodes), an execution time, (e.g., how long each request is taking to be processed by the standby node), and/or a response time (e.g., how long each standby node is taking to respond to a request) at operation 141. At operation 142, a new standby node may be added. The new node may be added based on when at least one of the number of requests is greater than or equal to a first predetermined number of requests, when the execution time is greater than or equal to a first predetermined execution time, and/or the response time is greater than or equal to a first predetermined response time. That is, operations 141 and 142 may be used to determine whether additional standby nodes need to be added, and add one or more new standby nodes (e.g., read-only replicas of the primary node of the database) to the database system. Dynamically adding nodes based on usage may prevent users and/or customers of the application from being turned away due to increased volume of requests to the application, and avoid database system unavailability.

At operation 143, a standby node may be removed when at least one of the number of requests is less than a second predetermined number of requests, when the execution time is less than a second predetermined execution time, and/or the response time is less than a first predetermined response time. That is, operations 141 and 143 may determine when there are too many standby nodes, based on the number of requests. The number of standby nodes may be reduced to reduce resource costs, and the like.

Figure 3B:
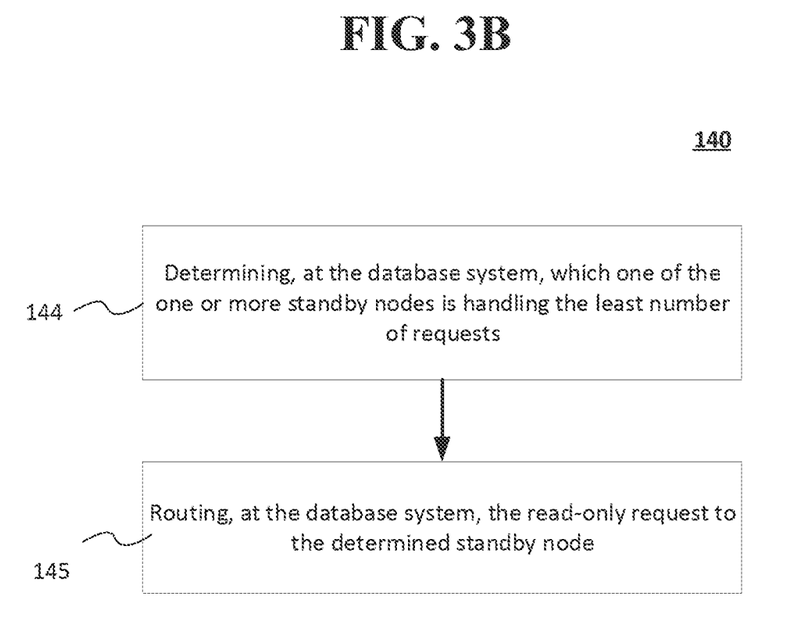

FIG. 3B shows optional operations that may be part of operation 140 of FIG. 1 according to implementations of the disclosed subject matter. At operation 144, the database system (e.g., database 900 shown in FIGS. 5-6) may determine which one of the one or more standby nodes is handling the least number of requests. At operation 145, the database system may route the read-only request to the determined standby node.

In some implementations, the routing the read-only request to one of the standby nodes to handle the read-only request for the data at operation 140 may include invoking an application program interface (API) to execute a query on one of the standby nodes to retrieve the requested data. For example, as shown in FIG. 5, a modified API 316 may be invoked to execute a database query on one of the standby nodes (e.g., standby node 904, 906, and/or 908) based on the execution of an operation in one of the modified classes of the application. That is, the modified API 316 may be used when a read-only operation is invoked based on the modified class.

At operation 150, the standby node (e.g., standby node 904, 906, and/or 908) may transmit the retrieved data to the server (e.g., server 700 and/or server 800 shown in FIG. 6) to complete the execution of the operation of the modified class for the application program. For example, a page 306 of FIG. 5 may be displayed for a telecommunications company web storefront, where the executed operation of the modified class may display recommendations for a phone and/or a calling plan for a customer.

Figure 2A:
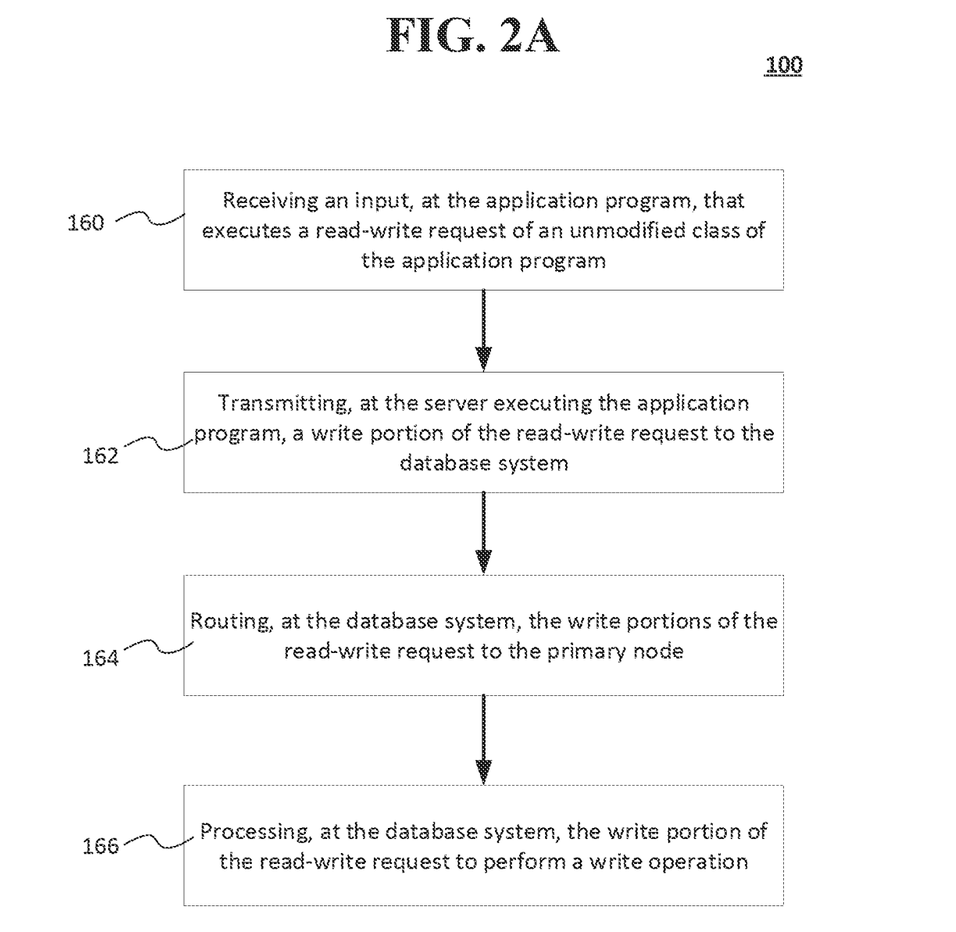

FIGS. 2A-2B shows optional operation of method 100 of FIG. 1. At operation 160 of FIG. 2A, the application program may receive an input that executes a read-write request of an unmodified class of the application program. At operation 162 the server (e.g., server 800 shown in FIG. 6) executing the application program may transmit a write portion of the read-write request to the database system (e.g., database 900 shown in FIGS. 5-6). At operation 164, the database system may route the write portions of the read-write request to the primary node (e.g., primary node 902 shown in FIG. 5). At operation 166, the database system may process the write portion of the read-write request to perform a write operation.

That is, unmodified classes of the application, such as those which may include a write request operation to the database system, may be routed to the primary node. The dynamic increase or decrease of the standby nodes may handle read-only requests so that the application and database may remain operational during periods of high volumes of read-only requests to the database system (e.g., where the number of requests exceeds a predetermined number). The primary node may handle read-write requests from operations in classes o the application that have not been modified. Other optional operations may be shown in FIGS. 2B-2C.

Figure 2B:
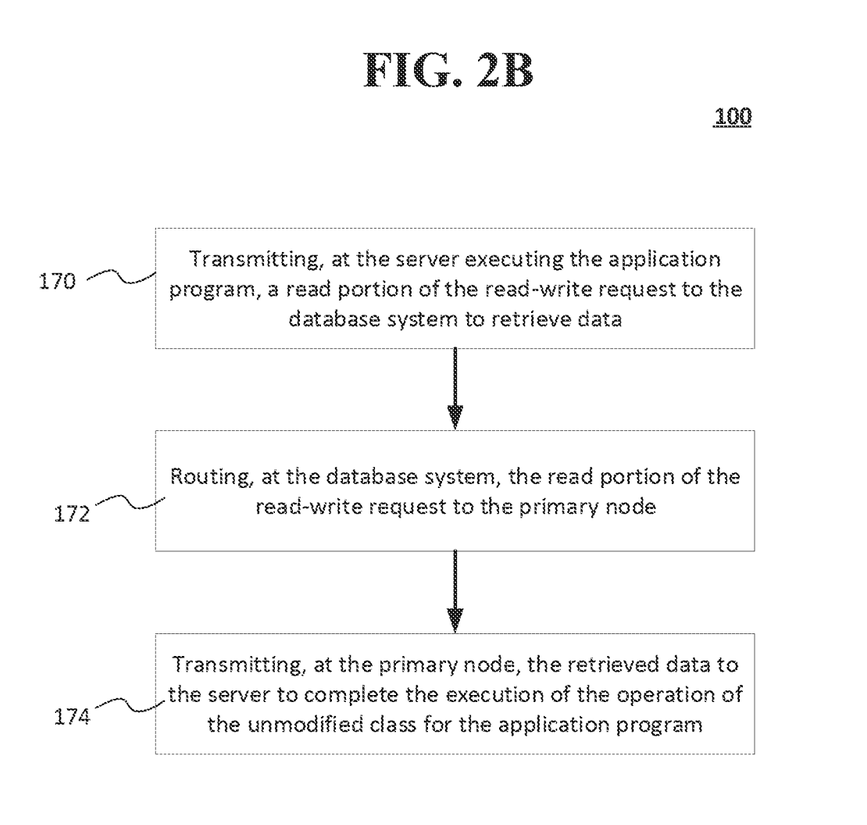

At operation 170 of FIG. 2B, the server executing the application program may transmit a read portion of the read-write request to the database system (e.g., database 900 shown in FIGS. 5-6) to retrieve data. At operation 172, the database system may route the read portion of the read-write request to the primary node (e.g., primary node 902 shown in FIG. 5). At operation 174, the primary node may transfer the retrieved data to the server to complete the execution of the operation of the unmodified class for the application program.

In some implementations, method 100 may include having the server (e.g., server 700 shown in FIG. 6) modify the class of the application program to enforce access control during data access from the class. In some implementations, the method 100 may include where the server modifies the class of the application program that includes one or more nested classes. This modification may route the request that is a read-only request to the database system (e.g., database 900 shown in FIGS. 5-6) to the one or more standby nodes (e.g., standby node 904, 906, and/or 908 shown in FIG. 5) for an operation performed by the one or more of the nested classes. The routing may be performed when the application program receives an input that executes the modified class that includes the one or more nested classes.

FIGS. 4A-4C show examples of modifications of classes according to an implementation of the disclosed subject matter. Although the examples of classes shown in FIGS. 4A-4C are in the Apex language, other suitable computer languages may be used. As described above in connection with operation 110 of FIG. 1, a class may be modified (e.g., at server 700 shown in FIG. 6) to route a request that is a read-only request to a standby node of the database system. In the example shown in FIG. 4A, class 200 may be modified with the "with rocs" modifier 202. The "rocs" may refer to a Read-Only Clone for Scale (ROCS), which may be a feature where requests of the class may be sent to a standby node of a database system (e.g., a read-only replica node of a primary node), such as standby node 904, 906, and/or 908.

The example class 210 shown in FIG. 4B may include the "with sharing, rocs" modifier 212. That is, classes may be modified in operation 110 to include a plurality of modifiers. For example, the modifier 212 may include a plurality of modifiers, such as "with sharing" and "rocs". As described above, the "rocs" may allow for requests to be sent to the standby nodes of a database, as they relate to read-only request. The "with sharing" portion of the modifier 212 may provide access control to data of the class. That is, the "with sharing" may provide for sharing of data between the class 210 and another class (e.g., another class that may be modified to share data and/or other parameters) of the application program.

The example class 220 shown in FIG. 4C may include the "with inherited rocs" modifier 222. Similar to the example shown in FIG. 4B, the example class 220 in FIG. 4C may include a plurality of modifiers that may be added at operation 110 of FIG. 1, as discussed above. The "with inherited" portion of the modifier 222 may provide for sharing of data within nested classes.

FIG. 5 shows an example arrangement using classes, an Application Programming Interface (API), and a database having a primary node and one or more standby (read-only) nodes according to an implementation of the disclosed subject matter. Application 300 may be, for example, a web application, web-based store front, and/or other application that includes a portion that a user and/or customer may interact with. Such applications may need to scale rapidly to handle requests from users and/or customers, such as when a new product and/or service launches, and customers may want to learn more about and/or purchase the product and/or service. The application may be executed by server 700 and/or server 800 shown in FIG. 6.

For example, a telecommunications company may have a web store front application (e.g., application 300) to sell phones and/or calling plans. During a promotional event, such as launching of a new phone, there may many consumer interactions with the application (e.g., requests for information about the new phone, calling plans, and/or details about the promotion). The application (e.g., application 300) and the related database system (e.g., database 900) may need to scale so that no customer is unable to view the information being requested, and/or to avoid a loss of sales of the phone and/or calling plans to system unavailability (e.g., because the system being unable to handle the volume of customer requests). The scaling may include increasing or decreasing the standby nodes (e.g., standby nodes 904, 906, and/or 908) to accommodate the number of read-only requests from the application to the database system.

Classes of the application 300 may be modified as described above in operation 110 of FIG. 1 to form the read-only class 302. The read-only class 302 may be invoked when a customer makes a selection in the application which calls the read-only class 302 to request data from the standby nodes 904, 906, and/or 908 (i.e., read-only replicas of the primary node 902) of database 900, where the operation is a read-only operation. Read-write class 304 may be invoked when a customer makes a selection in the application which calls the read-write class 304 to read and/or write data to the primary node 902 of the database 900. From the example above, the read-write class 304 may be called when a customer is making a purchase of a new phone and/or calling plan (e.g., to update the inventory of the number of phones that is stored in the database 900).

Page 306 of the application 300 may be a web page or other user interface that may be displayed for a customer and/or user (e.g., on display 520 of computer 500 shown in FIG. 6). To continue with the example above, the page 306 may be provided to a customer. Based on a user selection (e.g., such as to view page 306), the read-only class 302 may be invoked to fetch data from one of the standby nodes 904, 906, and/or 908 to be presented in the page 306. Continuing the example from above, the read-only class may fetch recommendations for a customer for a particular phone and/or calling plan.

Page 308 of the application may be web page or other user interface that may receive user and/or customer input of information, and/or may be for a transaction. Continuing the example from above, the page 308 may perform a checkout operation for a customer for a purchase of a phone and/or a calling plan. Page 308 may invoke read-write class 304 to perform the operation to persist the data in the primary node 902 of the database 900. If the customer purchases a phone, the read-write class may reduce the total count of phones in inventory stored at the primary node 902 of database 900.

Customer relationship management (CRM) application 310 may operation in connection with the application 300 and the database 900. The CRM application may be executed by server 700 and/or server 800 shown in FIG. 6. The CRM application 310 may compile data from a range of different communication channels, including a company's website, telephone, email, chat, social media channels, and the like. The CRM application may be configured so that a business may learn more about their target customer, and how to best address customer needs. The CRM application 310 may be used in acquiring and/or retaining customers, and/or driving sales growth.

Cached compiled code 312 of the CRM application 310 may include compiled code that may include the read-only class 302 and/or read-write class 304, and/or may receive calls from the read-only class 302 and/or read-write class 304.

Parse class modifier 314 of the CRM application 310 may be used to parse any modifier (e.g., modifier 202, 212, and/or 222 of class 202, 210, and/or 220 shown in FIGS. 4A-4C) of a class (e.g., a class that was modified by operation 110 of FIG. 1). For example, in displaying page 306 and/or receiving a selection from an item displayed on page 306, the read-only class 302 may be invoked and the parse class modifier 314 may parse the modifier of the read-only class 302.

Modified Application Program Interface (API) 316 handle classes that have modifiers (e.g., modifier 202, 212, and/or 222 of class 202, 210, and/or 220 shown in FIGS. 4A-4C). For example, parse class modifier 314 may parse the modifier of a class to determine a read-only class 302, and the modified API 316 may be invoked to execute a read-only database query on one of the standby nodes 904, 906, and/or 908.

Default Application Program Interface 318 may handle classes that have not been modified, such as the read-write class 304. For example, page 308 may invoke the read-write class 304 to perform at least a write operation, and the default API 318 provide the read-write operation to the primary node 902 of the database 900.

Database 900 may include a primary node 902, and one or more standby nodes 904, 906, and/or 908. The standby nodes 904, 906, and/or 908 may be read-only replicas of the primary node 902 of the database system. The standby notes 903, 90, and/or 908 may be dynamically added or removed, based on the number of requests to the database 900, and/or based on the anticipated number of queries to the database 900. The standby nodes 904, 906, and/908 may handle read-only queries to the database to reduce the load handled by primary nodes 902. That is, the primary node may handle read-write queries based on the invoked default API 318, and the standby nodes 904, 906, and/or 908 may handle read-only operations from the modified API 316.

Implementations of the presently disclosed subject matter may be implemented in and used with a variety of component and network architectures. FIG. 6 is an example computer 500 which may display a user interface for the application 300 of FIG. 5 (e.g., a web application, a commerce application, or the like). In some implementations, the computer 500 may modify one or more classes of the application that may be executed by server 700 and/or server 800 shown in FIG. 6.

As shown in FIG. 6, the computer 500 may communicate with a server 700 (e.g., a server, cloud server, database, cluster, application server, neural network system, or the like) via a wired and/or wireless communications network 600. The server 700 may be a plurality of servers, cloud servers, databases, clusters, application servers, neural network systems, or the like. The server 700 may include a processor 705, which may be a hardware processor, a microprocessor, an integrated circuit, a field programmable gate array, or the like. The server 700 may include a storage device 710. The storage 710 may use any suitable combination of any suitable volatile and non-volatile physical storage mediums, including, for example, hard disk drives, solid state drives, optical media, flash memory, tape drives, registers, and random access memory, or the like, or any combination thereof. The server 700 may be communicatively coupled to database 900, which may use any suitable combination of any suitable volatile and non-volatile physical storage mediums, including, for example, hard disk drives, solid state drives, optical media, flash memory, tape drives, registers, and random access memory, or the like, or any combination thereof. The server 700 may be communicatively coupled to server 800, which may be one or more servers, cloud servers, databases, clusters, application servers, neural network systems, or the like. The server 800 may include a processor 805, which may be a hardware processor, a microprocessor, an integrated circuit, a field programmable gate array, or the like Server 800 may include storage 810, which may use any suitable combination of any suitable volatile and non-volatile physical storage mediums, including, for example, hard disk drives, solid state drives, optical media, flash memory, tape drives, registers, and random access memory, or the like, or any combination thereof. The server 700 and/or server 800 may execute one or more application instances (e.g., of application 300 and/or CRM application 310 of FIG. 5). The server 700 and/or 800 may use data from the database 900 in providing a storefront and/or website to an end user of the computer 500.

The storage 710 of the server 700 and/or the storage 810 of the server 800 may store data for one or more instances of the application, updates for the application, the CRM application, and the like. Further, if the storage 710, storage 910, and/or database 800 is a multitenant system, the storage 710, storage 910, and/or database 800 can be organized into separate log structured merge trees for each instance of a database for a tenant. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks, such as communications network 600.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIG. 6 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "modifying," "receiving," "transmitting," "routing," "processing," "determining," "adding," "removing," "invoking," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
    modifying, at a server that is communicatively coupled to a database system that includes a primary node and one or more standby nodes, a class of an application program that includes one or more nested classes to route a request that is a read-only request to the database system to the one or more standby nodes of the database system for an operation performed by the one or more of the nested classes, wherein the modifying the class of the application program to route the request to the database system to the one or more standby nodes for the operation performed by the one or more of the nested classes when the application program receives an input to execute the modified class that includes the one or more nested classes;
    executing, at the server, based on the input, the operation of the modified class of the application program that includes the one or more nested classes;

transmitting, at the server executing the application program, the read-only request to the database system for data to complete the executing of the operation of the modified class;

routing, at the database system, the read-only request to one standby node of the one or more standby nodes to handle the read-only request for the data; and transmitting, at the standby node, the retrieved data to the server to complete the execution of the operation of the modified class for the application program.

2. The method of claim 1, further comprising:

receiving an input, at the application program, that executes a read-write request of an unmodified class of the application program;

transmitting, at the server executing the application program, a write portion of the read-write request to the database system;

routing, at the database system, the write portion of the read-write request to the primary node; and processing, at the database system, the write portion of the read-write request to perform a write operation.

3. The method of claim 2, further comprising:

transmitting, at the server executing the application program, a read portion of the read-write request to the database system to retrieve data;

routing, at the database system, the read portion of the read-write request to the primary node; and transmitting, at the primary node, the retrieved data to the server to complete the execution of the operation of the unmodified class for the application program.

4. The method of claim 1, further comprising:

modifying, at the server, the class of the application program to enforce access control during data access from the class.

5. The method of claim 1, wherein the routing comprising:

determining, at the database system, the usage of the one or more standby nodes based on at least one selected from a group consisting of: a number of requests, execution time, and response time;

adding a new standby node based on at least one selected from a group consisting of:

when at least one of the number of requests is greater than or equal to a first predetermined number of requests, when the execution time is greater than or equal to a first predetermined execution time, and the response time is greater than or equal to a first predetermined response time; and removing a standby node based at least one selected from a group consisting of: when at least one of the number of requests is less than a second predetermined number of requests, when the execution time is less than a second predetermined execution time, and the response time is less than a first predetermined response time.

6. The method of claim 1, wherein the routing the read-only request to one of the standby nodes to handle the read-only request for the data comprises: invoking an application program interface (API) to execute a query on one standby node of the standby nodes to retrieve the requested data.

7. The method of claim 1, wherein the routing the read-only request to one standby node of the standby nodes comprises:

determining, at the database system, which one standby node of the one or more standby nodes is handling the least number of requests; and routing, at the database system, the read-only request to the determined standby node.

8. A system comprising:

a database system that includes a primary node and one or more standby nodes; and a server that includes at least one hardware processor and that is communicatively coupled to the database system, the server configured to:

modify a class of an application program that includes one or more nested classes that is executed by the server to route a request that is a read-only request to the database system to the one or more standby nodes of the database system for an operation performed by the one or more of the nested classes, wherein the modifying the class of the application program to route the request to the database system to the one or more standby nodes for the operation performed by the one or more of the nested classes when the application program receives an input to execute the modified class that includes the one or more nested classes;

execute, based on the input, an operation of the modified class of the application program that includes the one or more nested classes; and transmit the read-only request to the database system for data to complete the executing of the operation of the modified class, wherein the database system routes the read-only request to one standby node of the one or more standby nodes to handle the read-only request for the data, and the standby node transmits the retrieved data to the server for the operation of the modified class to complete the execution of the operation for the application program.

9. The system of claim 8, wherein the server receives an input at the application program that executes a write portion of a read-write request of an unmodified class of the application program and transmits the write portion of the read-write request to the database system, wherein the database system routes the write portion of the read-write request to the primary node, and processes the write portion of the read-write request to perform a write operation.

10. The system of claim 9, wherein the server transmits a read portion of the read-write request to the database system to retrieve data, and wherein the database system routes the read portion of the read-write request to the primary node, and the primary node transmits the retrieved data to the server to complete the execution of the operation of the unmodified class for the application program.

11. The system of claim 8, wherein the server modifies the class of the application program to enforce access control during data access from the class.

12. The system of claim 8, wherein the routing by the database system includes determining an usage of the one or more standby nodes based on at least one selected from a group consisting of: a number of requests, execution time, and response time, wherein the database system adds a new standby node based on at least one selected from a group consisting of: when at least one of the number of requests is greater than or equal to a first predetermined number of requests, when the execution time is greater than or equal to a first predetermined execution time, and the response time is greater than or equal to a first predetermined response time, and wherein the database system removes a standby node based at least one selected from a group consisting of: when at least one of the number of requests is less than a second predetermined number of requests, when the execution time is less than a second predetermined execution time, and the response time is less than a first predetermined response time.

13. The system of claim 8, wherein the routing the read-only request to one standby node of the standby nodes to handle the read-only request for the data includes invoking an application program interface (API) to execute a query on one standby node of the standby nodes to retrieve the requested data.

14. The system of claim 8, wherein the routing the read-only request by the database system to one standby node of the standby nodes includes determining which one standby node of the one or more standby nodes is handling the least number of requests, and routing the read-only request to the determined standby node.

* * * * *